United States Patent [19]
Abraham

[11] Patent Number: 5,634,659
[45] Date of Patent: Jun. 3, 1997

[54] AIR BAG WITH A VENT

[75] Inventor: Michelle M. Abraham, Macomb, Mich.

[73] Assignee: TRW Vehicle Safety Systems Inc., Lyndhurst, Ohio

[21] Appl. No.: 511,009

[22] Filed: Aug. 3, 1995

[51] Int. Cl.$^6$ .................................. B60R 21/30
[52] U.S. Cl. ........................................ 280/739
[58] Field of Search ..................... 280/739, 743.1

[56] References Cited

U.S. PATENT DOCUMENTS

| | | | |
|---|---|---|---|
| 4,805,930 | 2/1989 | Takada | 280/739 |
| 5,219,179 | 6/1993 | Eyrainer et al. | 280/739 |
| 5,226,671 | 7/1993 | Hill | 280/743.1 |
| 5,249,824 | 10/1993 | Swann et al. | 280/729 |
| 5,492,362 | 2/1996 | Lehman et al. | 280/739 |

Primary Examiner—Kenneth R. Rice
Attorney, Agent, or Firm—Tarolli, Sundheim, Covell, Tummino & Szabo

[57] ABSTRACT

An inflatable air bag (10) for restraining a vehicle occupant (14) includes woven air bag material defining a chamber (20) into which inflation fluid is directed to inflate the air bag (10). The air bag material (10) has an opening (30) for venting fluid from the chamber (20). Reinforcement material (36) is fixedly secured to the air bag (10) and surrounds the opening (30) in the air bag material (10). The reinforcement material (36) has a weave orientation (52) that extends at an angle to a weave orientation (50) of the air bag material (10). Orientation means (40, 42) on the air bag (10) and the reinforcement material (36) help ensure that the weave orientations extend at an angle to each other.

6 Claims, 2 Drawing Sheets 5,634,659

AIR BAG WITH A VENT

BACKGROUND OF THE INVENTION

The present invention relates to an air bag, and more specifically to an air bag with an opening for venting inflation fluid from the interior of the air bag.

A known air bag has an opening for venting inflation fluid from the interior of the air bag. Reinforcement material is secured to the air bag and surrounds the opening in the air bag to minimize fraying of the air bag material adjacent the opening when fluid is vented from the interior of the air bag.

SUMMARY OF THE INVENTION

The air bag of the present invention includes woven air bag material defining a chamber into which inflation fluid is directed to inflate the air bag. The air bag has surface means for defining an opening for venting inflation fluid from the chamber. The air bag material has a first weave orientation. Woven reinforcement material is fixedly secured to the air bag material and surrounds the opening in the air bag material. The reinforcement material has a second weave orientation extending at an angle to the first weave orientation of the air bag material.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

An inflatable air bag 10 (FIG. 1) is a part of a vehicle occupant restraint system 12. The vehicle has a forward direction of travel indicated by an arrow A and a rearward direction of travel indicated by an arrow B. Before inflation of the air bag 10, the air bag is typically folded and stored in an air bag storage compartment 16 located, as illustrated, in the instrument panel of the vehicle. The air bag 10 may be folded and stored in an air bag storage compartment at a different location, such as in the vehicle door, vehicle seat or in the steering wheel of the vehicle. The folded and stored air bag 10 is in a condition ready for deployment upon occurrence of a vehicle collision requiring air bag deployment. The illustrated air bag 10 inflates in a rearward direction and, when inflated, helps protect a vehicle occupant 14 during a collision.

Figure 2:
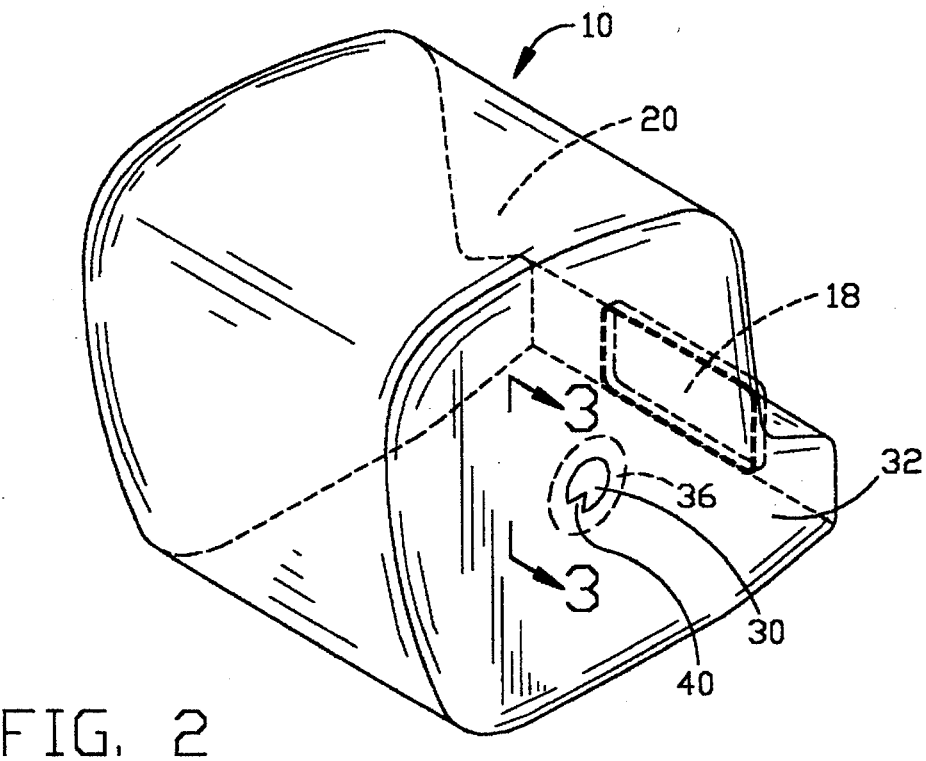
FIG. 2 is an enlarged perspective view of the air bag shown in FIG. 1.

The air bag 10 has an opening 18 (FIG. 2) through which inflation fluid flows into an interior chamber 20 of the air bag 10 to inflate the air bag. An actuatable inflator (not shown), when actuated, provides the inflation fluid to inflate the air bag 10. Although the opening 18 is illustrated as rectangularly shaped, the opening 18 may be of another shape.

The air bag 10 has a vent hole 30 (FIG. 2) located on one side 32 of the air bag 10. Although only one vent hole 30 is shown, there could be a number of other vent holes located on the same side 32 of the air bag 10 or at any suitable location on the air bag 10.

Figure 3:
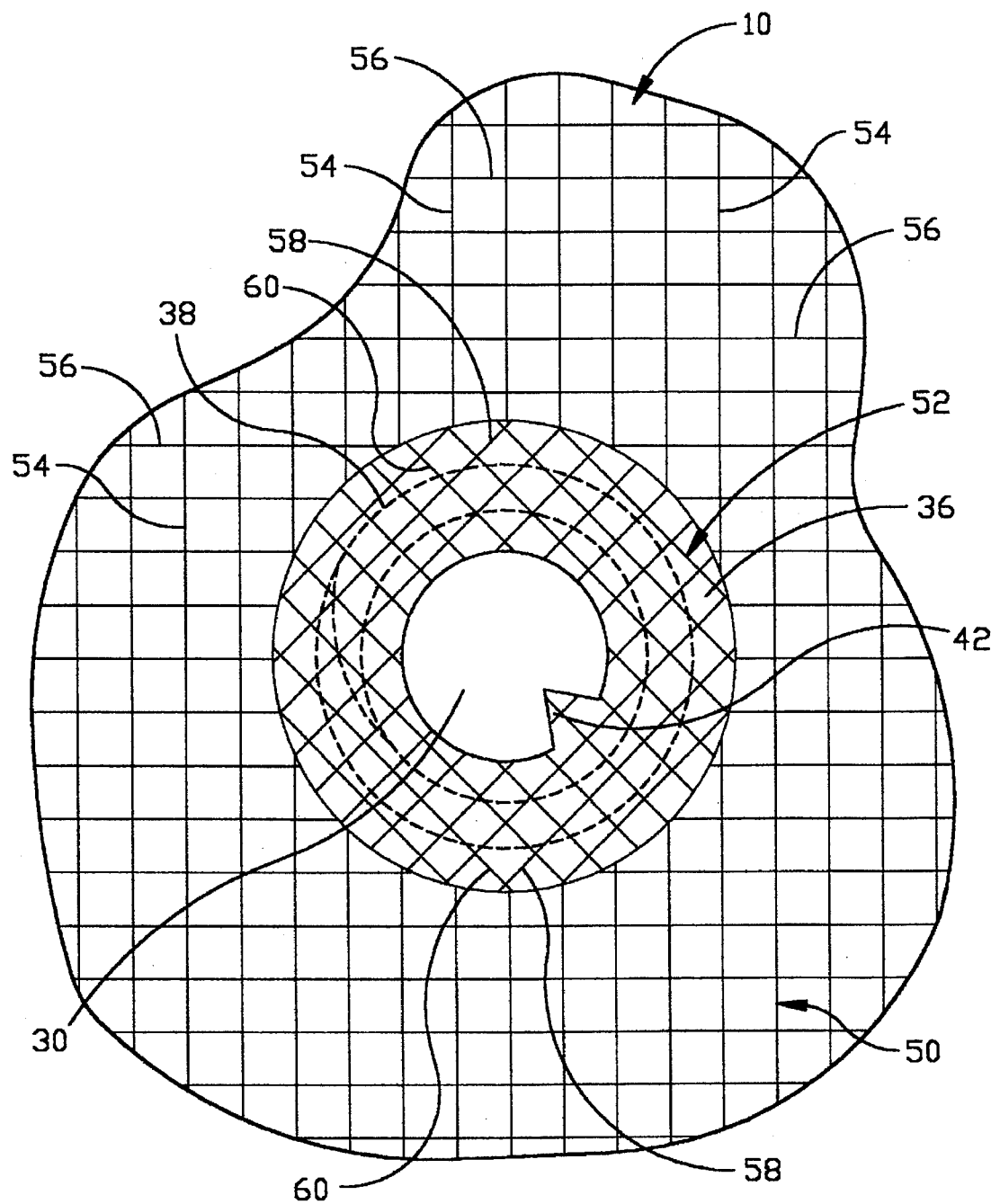
FIG. 3 is an enlarged view of an interior portion of the air bag shown in FIG. 2 taken along line 3—3 of FIG. 2.

A vent reinforcement 36 is preferably sewn to the inside of the air bag 10 so that the reinforcement surrounds the vent opening 30 in the air bag. Preferably, the reinforcement 36 is a ring-shaped piece of material sewn to the air bag 10 by stitches 38, as shown in FIG. 3.

The air bag 10 is made from a woven material. The material of the air bag 10 has a weave orientation defined by the cross-hatching 50 in FIG. 3. The cross-hatching 50 represents the directions in which warp threads 54 and weft threads 56 of the material of the air bag 10 extend. The warp threads 54 and the weft threads 56 extend generally perpendicular to each other. Although FIG. 3 only shows a few warp threads 54 and a few weft threads 56, it is understood that the material of the air bag 10 has many warp and weft threads. Although the warp threads 54 are shown extending vertically in FIG. 3 and the weft threads 56 are shown extending horizontally in FIG. 3, the warp and weft threads could extend in any desired direction.

The vent reinforcement 36 is also made from a woven material. The material of the vent reinforcement 36 has a weave orientation defined by the cross-hatching 52 in FIG. 3. The cross-hatching 52 represents the directions in which warp threads 58 and weft threads 60 of the material of the reinforcement 36 extend. The warp threads 58 and the weft threads 60 extend generally perpendicular to each other. Although FIG. 3 only shows a few warp threads 58 and a few weft threads 60, it is understood that the material of the reinforcement 36 has many warp and weft threads.

The directions that the warp threads 58 and weft threads 60 of the material of the vent reinforcement 36 extend depend on the directions that the warp threads 54 and weft threads 56 of the material of the air bag 10 extend. The warp threads 58 and weft threads 60 of the material of the reinforcement 36 do not extend parallel to or overlie the warp threads 54 or the weft threads 56 of the material of the air bag 10. The warp threads 58 and the weft threads 60 of the material of the reinforcement 36 extend at angles to the warp threads 54 and the weft threads 56 of the material of the air bag 10 such that the weave orientation 52 of the material of the reinforcement extends at an angle to the weave orientation 50 of the material of the air bag. Preferably, the weave orientation 52 of the material of the reinforcement 36 extends at an angle of 45° relative to the weave orientation 50 of the material of the air bag 10.

The air bag 10 has an orientation projection 40 (FIG. 1) extending into the vent opening 30 of the air bag and defining a portion of the vent opening. The reinforcement 36 includes an orientation projection 42 (FIG. 3) which overlies the orientation projection 40 of the air bag 10. The orientation projections 40 and 42 in the air bag 10 and the reinforcement 36, respectively, ensure that the weave orientation 52 of the reinforcement material extends at an angle to the weave orientation 50 of the air bag material. Although the projections 40 and 42 are shown as being triangular in shape, they may have any shape or may be notches in the air bag 10 and in the reinforcement 36.

Figure 1:
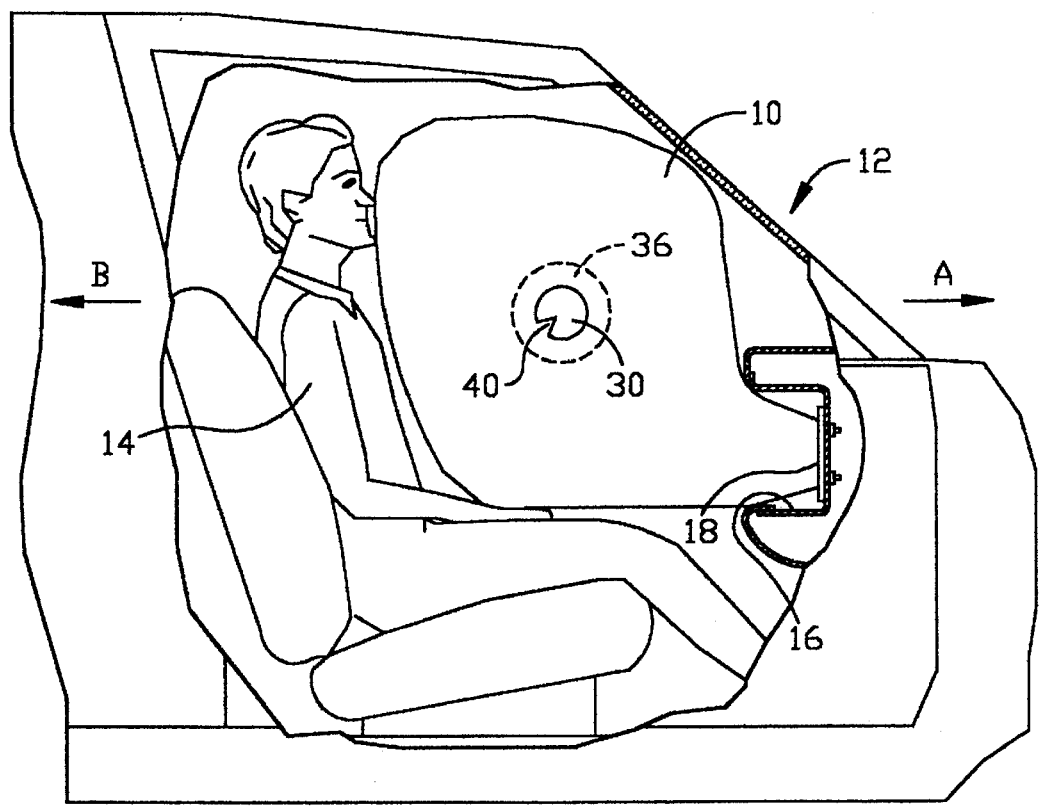
FIG. 1 is a schematic view of an inflatable air bag constructed in accordance with the present invention and incorporated in a vehicle occupant restraint system.

When a vehicle collision requiring air bag inflation occurs, inflation fluid is directed through the opening 18 into the interior chamber 20 of the air bag 10 to inflate the air bag as shown in FIG. 1. The occupant 14 moves forward against the inflating bag 10 as inflation fluid continues to flow into the interior chamber 20 of the air bag. The air bag 10 absorbs the energy resulting from movement of the occupant 14 against the air bag 10. As the inflating air bag 10 absorbs the energy resulting from movement of the occupant 14 against the air bag, the pressure in the interior chamber 20 of the air bag increases. Inflation fluid in the interior chamber 20 of the air bag 10 flows through the vent opening 30 to relieve the pressure in the interior chamber 20 of the air bag 10.

The reinforcement 36 helps prevent fraying of the air bag 10 as inflation fluid rapidly passes through the vent opening 30 in the air bag 10. Since the weave orientation 50 of the material of the air bag 10 and the weave orientation 52 of the material of the reinforcement 36 extend at an angle relative to each other, the fraying of the reinforcement material and the air bag material is minimized as compared to an air bag without a reinforcement or an air bag with a reinforcement that has a weave orientation extending parallel to the weave orientation of the air bag.

From the above description of the invention, those skilled in the art will perceive improvements, changes and modifications. Such improvements, changes and modifications within the skill of the art are intended to be covered by the appended claims.

Having described the invention, the following is claimed:

1. An inflatable air bag for, when inflated, protecting a vehicle occupant, said air bag comprising:

woven air bag material defining a chamber into which inflation fluid is directed to inflate said air bag, said air bag material having surface means for defining an opening for venting inflation fluid from said chamber, said air bag material having a first weave orientation; and woven reinforcement material fixedly secured to said air bag material and surrounding the opening in said air bag material, said reinforcement material having a second weave orientation extending at an angle to said first weave orientation of said air bag material.

2. An inflatable air bag as set forth in claim 1 wherein said second weave orientation of said reinforcement material extends at an angle of approximately 45° to said first weave orientation of said air bag material.

3. An inflatable air bag as set forth in claim 1 further including orientation means for orienting said reinforcement material on said air bag material to ensure that said second weave orientation extends at an angle to said first weave orientation.

4. An inflatable air bag as set forth in claim 3 wherein said orientation means includes a projection on said air bag material defining a portion of the opening in said air bag material and a projection on said reinforcement material overlying said projection on said air bag material and having a shape substantially similar to a shape of said projection on said air bag material.

5. An inflatable air bag as set forth in claim 1 wherein said reinforcement material is sewn onto said air bag material.

6. An inflatable air bag as set forth in claim 1 wherein said reinforcement material is a ring-shaped piece of material surrounding the opening in said air bag material.

* * * * *